(12) United States Patent
Borwankar et al.

(10) Patent No.: US 6,475,545 B2
(45) Date of Patent: Nov. 5, 2002

(54) EXTENDED SHELF LIFE RICOTTA CHEESE BLENDS AND PROCESS FOR PREPARING

(75) Inventors: Christine Borwankar, Addison, IL (US); Sandra Elaine Kelly-Harris, Hazel Crest, IL (US); Bennett Lee Brenton, Mundelein, IL (US); John Yen Hown Li, Chicago, IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/303,003

(22) Filed: Apr. 30, 1999

(65) Prior Publication Data

US 2001/0018089 A1 Aug. 30, 2001

(51) Int. Cl.7 .................. A23C 19/068; A23C 19/076; A23C 19/08
(52) U.S. Cl. ........................ 426/334; 426/582
(58) Field of Search .............. 426/334, 582, 426/36, 580

(56) References Cited

U.S. PATENT DOCUMENTS

| | | | | |
|---|---|---|---|---|
| 4,020,186 A | * | 4/1977 | Edwards | 426/36 |
| 4,194,011 A | * | 3/1980 | Invernizzi et al. | 426/8 |
| 4,584,199 A | * | 4/1986 | Taylor | 426/36 |
| 4,766,003 A | * | 8/1988 | Skovhauge et al. | 426/582 |
| 5,277,926 A | * | 1/1994 | Batz et al. | 423/582 |
| 5,573,806 A | * | 11/1996 | Farkye et al. | 426/582 |
| 5,679,396 A | * | 10/1997 | Finnocchiaro | 426/582 |
| 5,935,634 A | * | 8/1999 | Gamay et al. | 426/582 |

OTHER PUBLICATIONS

U.S. Food and Drug Administration, 1995, Bacteriological analytical manual, 8$^{th}$ ed., Association of Official Analytical Chemists, Arlington, VA.

Tanaka, N., et al., 1986, Evaluation of factors invovled in antibotulinal properties of pasteurized process cheese spreads, *J. Food Prot.*, 49:526–531.

* cited by examiner

*Primary Examiner*—Arthur L. Corbin
(74) *Attorney, Agent, or Firm*—Fitch, Even, Tabin & Flannery

(57) ABSTRACT

The present invention provides a method of preparing a spreadable stabilized and seasoned cheese blend based on ricotta cheese, as well as the ricotta cheese blend composition, and a lasagna kit that includes the ricotta cheese blend, optional shredded cheese, tomato sauce, and uncooked lasagna. The method of stabilizing the ricotta blend includes the step of treating the blend at a temperature in the range of 160° F. to 170° F. for a time sufficient to confer to the blend a shelf life stability against the growth of *Clostridium botulinum* for at least 20 weeks. In additional aspects of the method, the cheese blend, and the kit, the cheese blend further includes an additive chosen from among a second cheese other than ricotta, salt, spices, herbs, an edible acid, and a preservative, or a mixture of any two or more of these additives.

11 Claims, No Drawings

EXTENDED SHELF LIFE RICOTTA CHEESE BLENDS AND PROCESS FOR PREPARING

FIELD OF THE INVENTION

The present invention relates to spreadable ricotta cheese blends that are stable to storage at refrigerated temperatures for extended periods of time. The invention further relates to methods of preparing the ricotta cheese blend, and to meal or lasagna kits incorporating the ricotta cheese blend.

BACKGROUND OF THE INVENTION

Food products that minimize the preparation time in the home without sacrificing flavor and texture are in great demand in contemporary society. Some pasta dishes can be made quickly in the home kitchen; others, however, require time-consuming preparation if made from scratch. Lasagna, although a popular dish which contains flavorful components such as ricotta and other cheeses, herbs, spices, and a tomato based seasoned sauce, does require significant preparation time. Other pasta dishes containing ricotta cheese, including, for example, stuffed shells, manicotti, and the like, are also popular but time consuming when prepared in the home kitchen. With the limited time available in the modern family for food preparation, such dishes—especially if prepared from scratch—are often eliminated from, or only used sparingly in, the home menu. This is in spite of the popularity of such pasta dishes with the public.

If the desired flavor, aroma, and texture are to be developed, such pasta dishes must be made using fresh ingredients—including the ricotta cheese ingredient—and prepared largely, if not entirely, from scratch. As an example of this burden, the lasagna noodles in a baked lasagna preparation are typically cooked, or at least partially cooked, before being layered with cheese and sauce ingredients. The pre-cooking of the noodles, the arrangement of the various layers, and then the baking time requires both significant time and effort. For this reason, lasagna and other similar pasta dishes are often not prepared in the modern family kitchen where time for meal preparation is often limited.

A prepackaged ricotta cheese blend and/or a complete lasagna kit containing all necessary ingredients (including prepackaged and seasoned ricotta cheese blend) which are available for purchase in a retail grocery store would be a great convenience in the preparation of a baked lasagna dish. Its availability would significantly reduce the time and effort required in the assembly of the layered lasagna preparation prior to baking. Such a prepackaged ricotta blend would require a treatment at the time of packaging to ensure its stability during the shelf life prior to purchase, and after purchase, prior to its actual use. Extended periods of stability are required to achieve this objective. Moreover, the stabilized ricotta cheese blend would need to retain its spreadability during the extended shelf life, so that it could easily be layered into a lasagna preparation prior to baking. Such a spreadable and stabilized ricotta cheese blend and seasonings would further reduce preparation time and provide further convenience for the consumer. Such a stabilized, spreadable ricotta blend could be included as part of a lasagna kit, offering still further convenience to the consumer.

There thus remains a need for a stabilized, spreadable ricotta cheese blend which can be prepackaged for retail sale to the consumer. There also remains a need for a lasagna kit that includes the stabilized ricotta cheese blend as an important component thereof. The present invention addresses these needs.

SUMMARY OF THE INVENTION

The present invention provides a method of preparing a spreadable stabilized ricotta cheese blend, a stabilized ricotta cheese blend composition, and a lasagna kit that includes the stabilized ricotta cheese blend, optional shredded cheese, tomato-based sauce, and uncooked or precooked lasagna noodles. The ricotta cheese blend is stabilized by treating the cheese blend containing ricotta cheese and, optionally, other cheeses and/or ingredients at a temperature in the range of 160° F. to 170° F. for a time sufficient to provide a shelf life at refrigerated temperatures against the growth of *Clostridium botulinum* of at least 20 weeks. In an important embodiment of the method, the cheese blend is treated at a temperature of about 165° F. Importantly, in spite of the stabilization treatment, the ricotta cheese blend remains spreadable at refrigerated temperatures.

The ricotta cheese blend may also contain other ingredients or additives such as, for example, one or more additional cheeses other than ricotta, salt, spices, herbs, edible acids, and preservatives. Preferably, a mixture of two or more of these additives are employed in the cheese blend. Suitable second or others cheeses to be included in the cheese blend include, for example, Neufchatel cheese, Parmesan cheese, Romano cheese, Cheddar cheese, Mozzarella cheese, Provolone cheese, cream cheese, and a mixture of any two or more of these cheeses. Suitable edible acids include, for example, lactic acid, pyruvic acid, acetic acid, citric acid, tartaric acid, phosphoric acid, and the like. Suitable preservatives include sorbic acid and/or salts thereof. Of course, other conventional additives, such as colorants, flavorants, and the like, can be included in the ricotta cheese blend if desired.

DETAILED DESCRIPTION OF THE INVENTION

The present invention provides a spreadable, stabilized ricotta cheese blend suitable for use in preparing pasta dishes such as baked lasagna, stuffed shells, manicotti, and the like. The ricotta cheese blend is treated to render it stable to microbiological contamination for at least 20 weeks at refrigerated temperature (i.e., about 4 to 8° C.). In general, dairy products routinely sold at retail are stable for at least a short time under proper storage conditions. However, the ricotta cheese blends of the present invention advantageously include herbs, spices, and other additives to impart flavor to the baked lasagna preparation. The inclusion of such herbs and spices, however, may increase the microbiological contamination or burden beyond that which would normally be present in the dairy composition itself. Thus, a ricotta cheese blend similar to that of the present invention, except without the stabilization treatment provided in the present invention, could be a safety risk to the consumer. The stabilization treatment of the present invention significantly reduces that risk and provides a safe and stable product when stored and used properly.

Growth of pathogenic microorganisms, or of benign microbiological contaminants whose presence results in rejection by consumers, must be prevented in a stabilized product such as the present ricotta cheese blend. Pathogens include *Clostridium botulinum, Escherichia coli, Listeria monocytogenes, Staphylococcus aureus, Salmonella typhimurium,* and the like. More benign, but still objectionable, contaminants include yeasts, molds and the like. In order to achieve stability against the growth of such microbiological contaminants during the extended shelf life, the ricotta cheese blend must be treated to kill any microorganisms present. In this invention, a criterion for shelf life stability includes testing for the absence of C. botulinum growth during challenge experiments.

A common treatment intended to kill microbiological contaminants includes application of heat. Although a wide variety of such heating procedures are available to workers of skill in food science and may be employed for this purpose, they differ significantly from the heat treatment employed in the present invention. In pasteurization, for example, a liquid, such as a dairy liquid, is exposed to a temperature of about 161° F. for a short period of time (i.e., about 15 seconds). Such a pasteurization, if applied to the ricotta cheese blend of the present invention, would not be sufficient to stabilize the treated blend for an extended shelf life. In contrast, in the canning industry, for example, killing of microorganisms such as *C. botulinum* is accomplished by heating at temperatures of about 300° F. for a period of time in the range of about 3 about 6 seconds. Such a treatment, if applied to the instant ricotta cheese blend, would irreversibly alter the structure of the ricotta cheese blend such that it would no longer be spreadable and would adversely affect the organoleptic properties. Such a cheese blend would not be suitable for use in the intended applications of the present invention (i.e., preparation of lasagna and other pasta dishes).

The method of the present invention provides a heat treatment for the ricotta cheese blend that surprisingly provides an extended shelf life with increased and improved spreadability. Thus, the ricotta cheese blend of this invention is ideally suited for use in lasagna and other pasta dishes prepared and consumed in the home. The stabilization treatment involves subjecting the ricotta cheese blend to a cooking step in which the ricotta cheese blend is heated to a temperature in the range of from 160° F. to 170° F. for a time period sufficient to insure that all of the ricotta cheese blend reaches the desired temperature and that microorganisms that might be present are killed. Thus, more efficient mixing and/or heat transfer will allow for shorter high temperature treatment times. Generally, however, a high temperature treatment time of about 15 seconds to about 5 minutes is adequate. Preferably, treatment temperature is about 165° F. for a time period of about 1 to about 4 minutes. This heat treatment may be carried out in any conventional system (batch, semi-continuous, or continuous); for example, the heat treatment can be carried out in a laydown cooker with steam injection. The steam injection provides the means for attaining the desired temperature effectively and controllably. The duration of treatment at this temperature is sufficient effectively to kill microorganisms present, such that no growth of microbiological contaminants occurs in the stabilized product during a shelf life at refrigerated temperature of at least 20 weeks and preferably at least 40 weeks or longer. As those skilled in the art will realize, the length of time required at the lowest temperature (i.e., about 160° F.) to insure safety will be longer than that required at the higher temperature (i.e., about 170° F.); of course, the efficiency of mixing and heat transfer characteristics of the system must also be taken into account. Generally, for safety considerations, heat treatment times longer than the minimum needed or required for food safety considerations (e.g., high temperature, short time pasteurization at about 18 seconds at 165° F.—assuming excellent mixing and heat transfer) are preferred so long as spreadability is not adversely effected.

As just noted, the duration of the heat treatment step is generally about 15 seconds to about 5 minutes. Excessive cooking (i.e., significantly longer that the suggested heat treatment step) should be avoided since spreadability and flavor can be impaired. In actual application using the guidelines provided, it has been found that the stabilized ricotta blend prepared in this way is stable to growth of microorganisms for at least 40 weeks. The lower limit of the heat treatment temperature and its duration are determined and/or controlled by the requirement to achieve effective killing of any contaminants that may be present.

The upper limit for the temperature and duration of the heat treatment step are determined and/or controlled by the requirements of spreadability and flavor. Heating of cheeses generally leads to melting and a significant change in the structure of the cheese product. In a ricotta cheese blend, for example, such a change could lead to loss of body and/or texture and a loss of spreadability once the blend has cooled to ambient or refrigeration temperatures. Surprisingly, the inventors found that the ricotta cheese blend heat treated according to the method set forth herein, not only retained spreadability upon cooling, but actually exhibited improved spreadability. Thus, the stabilized ricotta cheese blend is very spreadable. This attribute confers usefulness as a prepackaged cheese spread for application to a layered lasagna preparation prior to baking and significantly reduces the preparation time for a layered lasagne or other pasta product (e.g., filled shells, manicotti, and the like). Without this spreadability, the stabilized ricotta cheese blend could not readily be used to prepare a layered lasagna or other pasta preparation. The upper temperature limit and the duration of the heating step are thus governed by the requirement of retaining the spreadability of the ricotta blend after it cools to ambient temperature and after storage at refrigerated temperatures for an extended period of time.

The duration of heat treatment required to achieve the prolonged stabilization of the present invention may vary with the size of the batch, equipment design, and heat transfer characteristics of the treatment equipment. Generally, mixing equipment offering high heat transfer and high mixing efficiency is preferred. One preferred heat treatment apparatus is a lay-down cooker with steam injection for heating. Of course other types of heat treatment apparatuses could be used so long as suitable heat transfer and mixing can be achieved. Generally, with a heat treatment in the range of about 160° F. to about 170° F., the length of the heat treatment will be in the range of about 15 seconds to about 5 minutes. As suggested above, good mixing is also required—especially when treating large batches—since all of the cheese blend must be exposed to the elevated temperatures.

Once the heat treatment has been completed, the stabilized ricotta cheese blend should be packaged and cooled to refrigeration temperatures (generally in the range of about 4 to about 8° C.). Preferably, the stabilized ricotta cheese blend is hot-packed or hot-filled in any suitable container and then allowed to cool to refrigerator temperatures. Preferably for home use, the stabilized ricotta cheese blend is packaged in single meal sizes. Such packaging could include, for example, glass or rigid plastic containers or, more preferably, sealable plastic pouches. More preferably, the stabilized ricotta cheese blend is packaged in single meal or dish amount in a sealable, flexible plastic pouch which is sealed to minimize the air within the package. If desired, and to add further stability to the product, the stabilized ricotta cheese blend can be sealed under an inert atmosphere, modified gas atmosphere, and/or under aseptic conditions. During shipment and on retail shelves, the ricotta cheese blend should be stored under similar refrigeration temperatures. Once purchased by the consumer, storage under normal home refrigeration temperatures (which may be somewhat greater than about 8° C.) is acceptable. The ricotta blend is stable for extended periods of time at any of these storage temperatures.

Additional, or supplemental, means of stabilizing the ricotta cheese blend of the invention can contribute to the overall stability of the ricotta cheese blend. Thus, for example, one or more edible acids may be included to provide a lower pH value in the blend. Sufficient edible acid can be added to reduce the pH of the stabilized ricotta cheese blend to between about 4.8 to about 5.2, and preferably to between about 4.9 to about 5.1. Salt is also included to provide a high osmolality to the blend as well as flavor. Additionally, one or more edible preservatives can be added to further increase the stability of the ricotta cheese blend. Any of these supplemental means contributes to a loss of viability of any microbiological contaminants that may be present. Suitable edible acids include, for example, lactic acid, pyruvic acid, acetic acid, citric acid, tartaric acid, and comparable edible organic acids, and phosphoric acid. Any equivalent acid may also be used to contribute to the stabilization of the ricotta blend. Salt, when added, is generally added at levels of about 1 to about 2 percent by weight; preferably, the overall or finished salt content of the final stabilized ricotta blend (added salt and salt entering with other ingredients) is in the range of about 1.8 to about 2.2 percent. Suitable preservatives include, for example, sorbic acid and/or salts thereof. The stabilized ricotta cheese blend may further include flavoring components such as herbs, spices, colorants, and the like for optimal consumer acceptance. Generally, any such additives—especially those that might contain microorganisms—are blended with the ricotta cheese prior to the heat treatment step and, thus, are exposed to the heat treatment step. The edible acid can be added either before and/or after the heat treatment step to achieve the desired pH of the final product.

To achieve superior stability, the stabilized ricotta cheese blend should contain sufficient edible acid to obtain a pH of between about 4.8 to 5.2, salt, and a preservative. Generally, the stabilized ricotta cheese blend preferably contains about 30 to about 90 percent ricotta cheese, about 1 to about 2 percent salt, about 0 percent to about 30 percent of the second cheese, about 0.1 to about 0.4 percent of the preservative, sufficient edible acid to provide a pH of about 4.8 to about 5.2 in the stabilized ricotta cheese blend; water, spices, and other additives (e.g., dried sweet whey, agglomerated corn starch, gum, and the like) make up the balance. Preferably, the stabilized ricotta cheese blend preferably contains about 40 to about 50 percent ricotta cheese, about 1 to about 2 percent salt, about 8 to about 12 percent of the second cheese, about 0.15 to about 0.2 percent of the preservative, sufficient edible acid to provide a pH of about 4.9 to about 5.1 in the stabilized ricotta cheese blend with the balance being water, spices, and other additives. Generally, the water or moisture content (including added water and water contained in the other ingredients) of the final stabilized ricotta cheese blend is in the range of about 60 to 75 percent with about 65 to 70 percent being preferred. Preferably the second cheese is Neufchatel cheese, Parmesan cheese, Romano cheese, or a mixture thereof; the preservative is sorbic acid or a salt thereof; and the edible acid is lactic acid, pyruvic acid, acetic acid, citric acid, tartaric acid, phosphoric acid, or mixtures thereof. Generally, the second cheese is used to impart desirable flavor and texture characteristics; likewise, additives such as agglomerated corn starch and gum (e.g., locust bean gum) can used to provide more favorable texture characteristics.

The spreadability of the stabilized ricotta cheese bends of the present inventions is an important characteristic. Conventional ricotta cheese, on the other hand, can be very difficult to spread over lasagna noodles. The improved spreadability of the stabilized ricotta cheese of this invention can be demonstrated using a TA-XT2 Texture Analyzer (Stable MicroSystems, Haslemere, England). Using the Texture Analyzer, the force required to penetrate a sample using a core of known material and cross section is inversely proportional to the sample's spreadability. In other words, the easier it is to penetrate a sample, the better spreadability for the sample. A conventional ricotta cheese was compared with several ricotta blends of this invention; the penetration force is an average of three separate runs:

| Sample | Penetration Force (g) |
|---|---|
| Conventional Ricotta | 63 |
| Italian Seasoned Ricotta Blend | 21 |
| American Seasoned Ricotta Blend | 38 |

The preparation of the Italian seasoned ricotta blend is described in Example 2; the preparation of the American seasoned ricotta blend is described in Example 3. The two ricotta blends of the present invention have significantly improved spreadability (i.e., lower penetration force) than conventional ricotta cheese.

In a further embodiment of the invention, a prepackaged, stabilized ricotta cheese blend is included in a lasagna kit to provide a complete package for convenient preparation of baked lasagna in the home. In addition to the stabilized spreadable seasoned ricotta cheese blend of the invention, the kit can include a prepackaged, stabilized, seasoned tomato based sauce, and a package of uncooked or partially cooked lasagna noodles. If desired, a stabilized second cheese composition may also be included in the kit; such second cheeses include, for example, Neufchatel cheese, Parmesan cheese, Romano cheese, Cheddar cheese, Mozzarella cheese, Provolone cheese, cream cheese, and mixtures thereof. Such second cheese, if used, would preferably be in the form of shreds. If desired, such other cheeses as just mentioned can be included in the stabilized ricotta cheese blend. Preferably, each of the prepackaged ingredients (i.e., stabilized ricotta cheese blend, tomato-based sauce, and lasagna noodles) are included in an amount suitable for the preparation of a single lasagna dish. Similar kits can be prepared using other pasta types. Kits containing enough ingredients to prepare several dishes can also be prepared; preferably, such multiple dish kits would still have the prepackaged ingredients in single dish amounts (e.g., a five dish kit would contain five separate packages of each ingredient).

Using the lasagna kit, alternating layers of the tomato based sauce, uncooked or partially precooked lasagna noodles, ricotta cheese blend, and, if desired, shredded cheese are placed in a baking dish. The improved spreadability of the present ricotta cheese blends makes the preparation of such lasagna significantly easier. Of course, other layers may also be included, such as, for example, pepperoni or other meat products, and second cheeses. The optional layers may be supplied as packaged components within the kit or obtained separately by the consumer. The completed layered preparation is then baked in an oven. The kit is formulated such that the water content of the cheeses and the tomato sauce is sufficient to rehydrate the lasagna noodles.

Using partially precooked lasagna noodles can reduce the cooking time and/or the water required to cook the dish.

The following examples are intended to illustrate the invention and not to limit it. Unless otherwise indicated, all percentages are by weight.

EXAMPLE 1

A ricotta blend was prepared containing ricotta cheese (about 59 percent), Philadelphia brand Neufchatel cheese (about 20 percent), grated Parmesan cheese (about 2.1 percent), dried sweet whey (about 2.5 percent), salt (about 1.4 percent), locust bean gum (about 0.3 percent). spices (about 2.3 percent), lactic acid (about 0.4 percent), sorbic acid (about 0.2 percent), and water (about 11.8 percent)) granulated garlic, granulated onion, and parsley flakes. The blend was processed to 165° F. in a laydown cooker with steam injection for a period of about 2 minutes. The spreadable ricotta blend was subjected to challenge experiments using Clostridium botulinum. There was no growth or toxigenesis of C. botulinum during 40 weeks at 55° F.

EXAMPLE 2

An Italian seasoned ricotta blend containing ricotta cheese (about 45 percent), Philadelphia Neufchatel cheese (about 11 percent), milk fat (about 3 percent), dried sweet whey (about 3.8 percent), sodium chloride (about 1.5 percent), locust bean gum (about 0.3 percent), lactic acid (about 0.6 percent), spices (about 2.4 percent), corn flour (about 3 percent), sorbic acid (about 0.2 percent), titanium oxide (about 0.5 percent), and water (about 29 percent) was prepared. The blend was processed to 165° F. in a laydown cooker for about 2 minutes. The stabilized ricotta blend has stability upon storage at refrigerated temperature (i.e., about 55° F.) similar to that of Example 1. As compared to the ricotta cheese alone, the stabilized ricotta blend was significantly easier to spread.

EXAMPLE 3

An American seasoned ricotta blend containing ricotta cheese (about 45 percent), Philadelphia Neufchatel cheese (about 11 percent), milk fat (about 2 percent), dried sweet whey (about 3.8 percent), sodium chloride (about 1.5 percent), locust bean gum (about 0.3 percent), lactic acid (about 0.6 percent), spices (about 2.3 percent), corn flour (about 3 percent), sorbic acid (about 0.2 percent), titanium oxide (about 0.5 percent), and water (about 30 percent) was prepared. The blend was processed to 165° F. in a laydown cooker for about 2 minutes. The stabilized ricotta blend has stability upon storage at refrigerated temperature (i.e., about 55° F.) similar to that of Example 1. As compared to the ricotta cheese alone, the stabilized ricotta blend was significantly easier to spread.

We claim:

1. A method of preparing a stabilized ricotta cheese blend, said method comprising preparing a ricotta cheese blend consisting of ricotta cheese, salt, a preservative, and a non-ricotta cheese selected from the group consisting of Neufchatel cheese, Parmesan cheese, Romano cheese, Cheddar cheese, Mozzarella cheese, Provolone cheese, cream cheese, and mixtures thereof; treating the ricotta cheese blend at a temperature in the range of 160° F. to 170° F. for a time sufficient to provide the stabilized ricotta cheese blend; and adding sufficient edible acid to the ricotta cheese blend or to the stabilized ricotta cheese blend to provide a pH of about 4.8 to about 5.2 for the stabilized ricotta cheese blend; wherein the stabilized ricotta cheese blend has a shelf life stability against the growth of *Clostridium botulinum* of at least 20 weeks and is spreadable.

2. The method as defined in claim 1, wherein the treatment time is about 15 seconds to about 5 minutes.

3. The method as defined in claim 2, wherein the edible acid is lactic acid, pyruvic acid, acetic acid, citric acid, tartaric acid, phosphoric acid, or mixtures thereof.

4. The method as defined in claim 2, wherein the preservative sorbic acid or a salt thereof.

5. The method as defined in claim 1, wherein the treatment temperature is about 165° F. and wherein the treatment time is about 1to about 4 minutes.

6. The method as defined in claim 1, wherein the blend of ricotta cheese contains about 40 to 50 percent ricotta cheese, about 1 to 2 percent salt, about 8 to about 12 percent of the non-ricotta cheese, and about 0.1 to about 0.4 percent of the preservative; and wherein the edible acid is sufficient to provide a pH of about 4.9 to about 5.1 for the stabilized ricotta cheese blend.

7. A stabilized ricotta cheese blend, wherein the stabilized ricotta cheese blend is prepared by a method comprising preparing a ricotta cheese blend consisting of ricotta cheese, salt, a preservative, and a non-ricotta cheese selected from the group consisting of Neufchatel cheese, Parmesan cheese, Romano cheese, Cheddar cheese, Mozzarella cheese, Provolone cheese, cream cheese, and mixtures thereof; treating the ricotta cheese blend to a temperature in the range of 160° F. to 170° F. for a time sufficient to provide the stabilized ricotta cheese blend; and adding sufficient edible acid to the ricotta cheese blend or to the [spreadable,] stabilized ricotta cheese blend to provide a pH of about 4.8 to about 5.2 for the stabilized ricotta cheese blend; wherein the stabilized ricotta cheese blend has a shelf life stability against the growth of *Clostridium botulinum* of at least 20 weeks and is spreadable.

8. The stabilized ricotta cheese blend as defined in claim 7, wherein the edible acid is sufficient to adjust the pH of the stabilized ricotta cheese blend to between about 4.9 and about 5.1, and the edible acid is lactic acid, pyruvic acid, acetic acid, citric acid, tartaric acid, phosphoric acid, or mixtures thereof.

9. The stabilized ricotta cheese blend as defined in claim 7, wherein the preservative is sorbic acid or a salt thereof.

10. The stabilized ricotta cheese blend as defined in claim 7, wherein the blend of ricotta cheese contains about 30 to about 90 percent ricotta cheese, about 1 to about 2 percent salt, about 0 to about 30 percent of the non-ricotta cheese, and about 0.1 to about 0.4 percent of the preservative; and wherein the edible acid is sufficient to provide a pH of about 4.8 to about 5.2 in the stabilized ricotta cheese blend;

wherein the preservative is sorbic acid or a salt thereof; and wherein the edible acid is lactic acid, pyruvic acid, acetic acid, citric acid, tartaric acid, phosphoric acid, or mixtures thereof.

11. The stabilized ricotta cheese blend as defined in claim 7, wherein the blend of ricotta cheese contains about 40 to about 50 percent ricotta cheese, about 1 to about 2 percent salt, about 8 to about 12 percent of the non-ricotta cheese, and about 0.1 to about 0.4 percent of the preservative; and wherein the edible acid is sufficient to provide a pH of about 4.9 to about 5.1 for the stabilized ricotta cheese blend.

* * * * *

UNITED STATES PATENT AND TRADEMARK OFFICE
CERTIFICATE OF CORRECTION

PATENT NO.    : 6,475,545 B2
DATED         : November 5, 2002
INVENTOR(S)   : Borwankar et al.

It is certified that error appears in the above-identified patent and that said Letters Patent is hereby corrected as shown below:

Column 8,
Line 10, after "preservative" insert -- is --.
Line 14, change "1to" to --1 to --.
Line 20, change "for" to -- in --.
Line 32, delete "[spreadable]".

Signed and Sealed this

Thirteenth Day of May, 2003

JAMES E. ROGAN
*Director of the United States Patent and Trademark Office*